United States Patent [19]
Di Fazio

[11] 3,872,638
[45] Mar. 25, 1975

[54] GLAZING BLOCK

[75] Inventor: Joseph Di Fazio, Warren, Mich.

[73] Assignee: Acorn Building Components, Inc., Detroit, Mich.

[22] Filed: Oct. 15, 1973

[21] Appl. No.: 406,156

[52] U.S. Cl.................... 52/476, 52/398, 52/500
[51] Int. Cl............................................. E06b 3/58
[58] Field of Search............ 52/394, 498, 395, 499, 52/501, 208, 474, 476, 398

[56] References Cited
UNITED STATES PATENTS

| | | | |
|---|---|---|---|
| 1,931,290 | 10/1933 | Himmel | 52/501 |
| 2,152,521 | 3/1939 | Lindsay | 52/499 |
| 3,196,998 | 7/1965 | Owen | 52/498 |
| 3,641,728 | 2/1972 | Hallauer | 52/498 |

FOREIGN PATENTS OR APPLICATIONS

| | | | |
|---|---|---|---|
| 194,583 | 1/1958 | Australia | 52/498 |
| 997,129 | 6/1965 | United Kingdom | 52/208 |

Primary Examiner—John E. Murtagh
Assistant Examiner—Robert Farber
Attorney, Agent, or Firm—Cullen, Settle, Sloman & Cantor

[57] ABSTRACT

Glazing blocks for clamping a window-like panel within a frame having a base portion arranged outwardly of the peripheral edge of the panel, and an inwardly directed shoulder portion against which the panel edge is abutted. The block has a base rested upon the frame base portion, an inwardly directed flange opposing the frame shoulder portion for clamping the panel therebetween, and a wedge-like panel edge engaging tongue portion arranged between the peripheral edge of the panel and the frame base portion. A self-tapping screw extends through an opening formed through the block base and penetrates the frame base for securing the block thereto. Said opening is increasingly widened at an acute angle relative to the panel in the direction extending from the exposed surface of the block base towards the block base surface engaged against the frame base surface. Thus, when the block is positioned upon the frame base with its flange and tongue engaging the panel, a screw is inserted through the block opening to initially penetrate the frame base at an acute angle relative to the panel. Thereafter, the screw is tilted into rough parallelism to the panel to thereby move the block towards and clamp the panel against the frame shoulder portion, and the screw penetration into the frame base is then completed.

7 Claims, 8 Drawing Figures

PATENTED MAR 25 1975   3,872,638

GLAZING BLOCK

BACKGROUND OF INVENTION

The invention herein relates to an improved means for mounting a glass panel within a frame, such as a frame formed of extruded aluminum or the like metal components. In the fabrication of glazed window and door panels, it is conventional to first form the panel, such as one or more sheets of glass, to size, and thereafter, either apply the frame components to the panel or alternatively to form the frame components into a complete frame and then insert and mount the panel within the frame. In either case, various types of glazing systems have been used to fasten the panel within the frame or components of the frame. One such system involves forming the frame with a continuous shoulder against which the panel edge is abutted and then securing a glazing strip against the opposite facing edge of the panel to hold the panel between the strip and the shoulder. In this system, as well as other types of conventional systems, it is extremely difficult to secure the panel tightly enough within the frame to prevent some relative movement, particularly when the fabricated frame panel is shipped and handled between the factory and the job site for installation. Hence, breakage of the panel or frame is relatively common.

Thus, the invention herein relates to an improved glazing means which tightly clamps a panel, such as a single or multiple glass sheet unit, within a fabricated frame, as for example, of the extruded aluminum component type, to prevent breakage caused by relative movement between the two, particularly during rough handling and shipment of the fabricated structure.

SUMMARY OF INVENTION

The invention herein contemplates a glazing block for tightly clamping and securing a panel, such as a glass sheet, within a frame and against a shoulder formed as part of the frame. The block, which is preferably formed of a short length of plastic material, includes a base portion with an opening through which a screw is inserted for fastening the block to the frame, and an inwardly extending flange for abutting against the panel and clamping the panel against the frame shoulder. The block also includes a wedge-like tongue arranged between the peripheral edge of the panel and the frame for wedging the panel in its planar direction. The screw opening is sloped or widened wherein its entrance is approximately of the diameter of the screw, but its exit, at the frame, is elongated in a direction towards the panel. Thus, the screw is initially inserted into the opening at an acute angle relative to the panel, and initially is penetrated into the frame at such an angle. Thereafter, it is forceably tilted upright or in rough parallelism with the panel to thereby slide the block towards the panel and frame shoulder for clamping the panel between the block flange and the frame shoulder. A number of such blocks are used around the periphery of a particular panel and then a sealing strip is removably fastened over the blocks to seal against the panel.

The blocks, which are extremely inexpensive, may be rapidly applied by use of a power screwdriver which thrusts the screws first at an angle and then is used to tilt the screws upright to tightly move the blocks for clamping the panel as well as to drive the wedge-like tongue of the block against the peripheral edge of the panel to tightly secure the panel to the frame. Conversely, the blocks may be quickly and easily removed, simply by removing the screws, for replacing the panel, as for example, where the glass is broken, and then the blocks may be reapplied to a new panel by merely moving them to different locations along the frame. By using self-tapping screws, the blocks may be applied at suitably spaced apart locations, e.g., every twelve or sixteen inches, anywhere along the frame.

An object of the foregoing construction is to so tightly lock the panels to the frames that should the unit be jarred or roughly handled, as for example attempting to lift the fabricated unit by holding only the uppermost frame component, the frame-panel unit will remain together, without any substantial relative movement, to thereby prevent breakage of either the panel or the frame. Simultaneously, the sealing between the panel and the frame is sufficiently tight, particularly where resilient sealing strips are applied between the panel edge and frame shoulder, to prevent air or moisture penetration.

These and other objects and advantages of this invention will become apparent upon reading the following description, of which the attached drawings form a part.

DETAILED DESCRIPTION

Figures 1, 2, 3, 4, 5, 6, 7, 8:
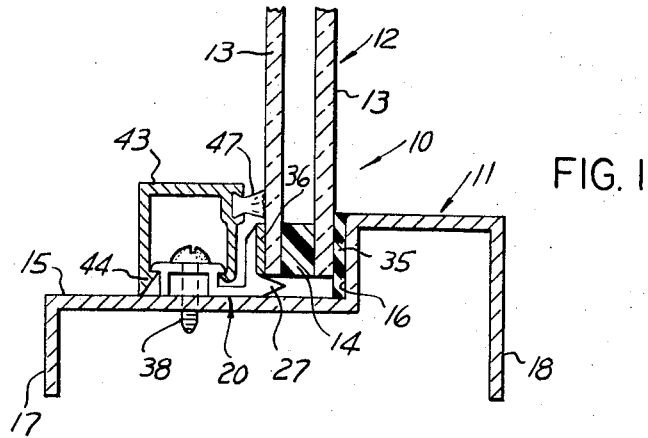
FIG. 1 is a cross-sectional elevational view of a lower portion of a framed panel.
FIG. 2 is a perspective, disassembled or exploded view of the parts forming the construction of FIG. 1.
FIG. 3 is a front elevational view of the glazing block.
FIG. 4 is a side view of the block taken in the direction of arrows 4—4 of FIG. 3.
FIG. 5 is a bottom view of the block taken in the direction of arrows 5—5 of FIG. 3.
FIGS. 6, 7 and 8 show the successive steps of securing the block to the frame by means of a screw fastener.

FIG. 1 illustrates in cross-section, a portion of a framed, glazed window 10 comprising a frame component 11, such as an extruded aluminum sill or header or jamb component, and a panel 12. The panel may be either a single sheet of glass or other similar materials used for window or door or similar paneling, or it may be formed of two parallel sheets of glass 13 joined together at their edges by a suitable sealing strip 14 to form a double pane, thermally insulated, panl unit.

The frame component may vary considerably in cross-section, there being many conventional shapes suitable for the purpose of this invention. For illustration purposes, the frame component has been simplified in the drawing. However, the component should include a frame base portion 15 which is arranged outwardly of and surrounds the peripheral edge of the panel. In addition, the frame component should include a shoulder portion 16 against which the panel is abutted, and also suitable additional structure such as mounting flanges 17 and 18 for mounting the frame upon the supporting structure of a building or the like.

The glazing block 20 is formed of a base 21 which may be solid, but preferably is U-shaped as illustrated in the drawing to form legs 22 integral with a channel base 23 whose edges are extended to form side flanges 24. One leg is provided with a base extension 25 upon which is formed an integral, inwardly directed flange 26 and a wedge-shaped tongue 27. In the middle of the base, a solid portion 29 is formed. Through this solid portion a screw receiving hold 30 is provided, with the hole being elongated in the direction towards the tongue and flange, that is, with its open end 31 located at the channel base 23 being approximately of the diameter of preselected size screw and its opposite open end 32 being sidened. Thus, in cross-section, the hole appears to be in the shape of a truncated, right-angle triangle.

In fabricating the framed window, four frame components 11 are assembled to form the rectangular frame of a size to receive the panel 12. Then, a thick, resiliently compressible strip, such as a foam plastic or rubberlike strip 35 is applied along the frame shoulder 16, between the shoulder and the panel edge.

While not essential, it is desirable to apply a length of doublefaced adhesive tape 36 to the flange 26 of the glazing block. Such tapes which are coated on opposite surfaces with a permanently tacky adhesive are conventionally available.

Thereafter, the panel 12 is inserted within the frame, against the strip 35 and the frame shoulder 16, and the block 20 is applied against the opposite face of the panel with its flange 26 in contact with the panel through the tape 36 and its tongue 27 contacting the peripheral edge of the panel and located between the panel peripheral edge and the frame base portion 15.

Referring to FIG. 6, a self-tapping screw 38 is inserted into the opening 30 in the block at an acute angle to the flange 26 and the panel. As indicated by the arrow 39, a screw applying force, which may be applied either manually or preferably with a power screwdriver, forces the tip of the screw to penetrate the frame component base portion 15. Next, as illustrated in FIG. 7, the screw is tipped upright or in rough parallelism with the flange 26 and the panel, as indicated by the curved arrow 40. The tipping of the screw about the fulcrum formed by the short penetration into the frame base, causes the block to move towards the panel as indicated by the arrow 41. This tightly compresses the strip 35 and tightly clamps the panel between the frame shoulder 16 and the glazing block flange 26, while simultaneously applying a wedging force from the tongue 27 in the direction of the plane of the panel. Next, the screw is completely applied or penetrated into the frame, as illustrated in FIG. 8 to maintain the compressive force against the panel.

A suitable number of blocks, which may be in the order of 1½ inches or so in length, may be applied around the edge of the panel at proper distances, such as on the order of 16 inches apart or therabouts.

Upon completion of the installation of the blocks, a U-shaped sealing cover strip 43 is applied to each of the frame components, with the strips being of substantially the length of the component. To secure the cover strips in place, barbed end portions 44 are formed on the opposite legs thereof, with the strip being sufficiently resilient so that the barbs snap over and engage with the side flanges 24 of the block. The cover strips may be configured so as to engage directly against the panel, inwardly of the block flange 26 or, as illustrated, may be provided with a channel 46 into which a conventional sealing gasket or strip material is inserted.

The completed structure is sufficiently rigid, that is, the panel is tightly clamped within the frame, so as to substantially eliminate the common problem of frame components moving in a direction planar to the panel should the unit be picked up by its uppermost frame component. Thus, breadage due to that form of lifting is substantially reduced.

Should the panel have to be replaced at any time, such as due to breaking in use, the glazing blocks may be easily removed by first pulling the sealing strips 43 free from the blocks to get access to the screws, and thereafter removing the screws 39 to remove the blocks. However, when a new panel is inserted, it is necessary to move the screws to a new location in order to repeat the operation of inserting the screws first at an acute angle and then tilted into parallelism with the panel. This can be accomplished by simply moving the blocks to a different position along the length of the frame components.

Having fully described an operative embodiment of this invention, I now claim:

1. In a framed panel construction including a frame component having a frame base portion arranged outwardly of a peripheral edge portion of a panel, and having an inwardly directed shoulder portion for abutting against a face portion of the panel adjacent said peripheral edge portion, a glazing block comprising:

a base initially slidably arranged upon said frame base portion said base having a lower surface positioned toward said frame base portion and an upper surface positioned away from said frame base portion, an integral, inwardly directed flange parallel to said shoulder portion for engaging the opposite face of the panel opposing said shoulder portion for clamping the panel therebetween;

a scre receiving opening extending through said base from the upper surface of the block to the lower surface of the block, with the opening at said upper surface being approximately the diameter of a preselected screw and the opening being widened along its length to a maximum width in a direction towards the shoulder portion and thereby being wider at said lower surface;

and a fastening screw extending through said opening initially at an acute angle to the shoulder portion and initially penetrating into said base portion and then being tilted into, and completely screwed into the base portion in, roughly parallelism with the shoulder portion for forceably sliding the block and the flange towards the panel and shoulder portion and clamping the panel between the flange and shoulder portion.

2. A construction as defined in claim 1 and an integral tongue formed upon the block and extended beyond the block flange toward the shoulder portion between the peripheral edge of the panel and the base portion and engaging against the peripheral edge of the panel for maintaining said peripheral edge spaced apart from said frame base portion.

3. A construction as defined in claim 2, and the surface of said tongue in engagement with the panel edge being sloped to form a wedge-like surface applying a force to the panel in the direction of the plane of the panel.

4. A construction as defined in claim 1 and including a resiliently compressible strip arranged between the panel and said shoulder portion for compressively sealing the panel against the shoulder portion when the block is forced by the screw towards the shoulder portion.

5. A construction as defined in claim 1 and said flange being adhesively secured to the panel by an adhesive applied therebetween.

6. A construction as defined in claim 1, and including a U-shaped in cross-section sealing strip mounted upon the block base, with releasable interlocking means formed on the legs of the sealing strip and the side edges of the block;

and sealing means mounted upon said sealing strip and engaging the panel along a line parallel to and inwardly of the free edge of the block flange.

7. In a framed panel construction including a frame component having a frame base portion arranged outwardly of a peripheral edge portion of a panel and having an inwardly directing shoulder portion for abutting against a face portion of the panel adjacent said peripheral edge portion, a glazing block for clamping said panel within said frame, and a screw for securing said glazing block to said frame, the improved glazing block comprising:

a base initially slidably arranged upon said frame base portion, said base having a lower surface position toward said frame base portion and an upper surface positioned away from said frame base portion, an integral inwardly directed flange parallel to said shoulder portion for engaging against an opposite face edge portion of the panel for clamping the panel between the flange and the frame shoulder portion, and a screw receiving opening extending transversely through said block base, with the opening being both wider at the lower surface of the base and closer to the flange than at the upper base surface, whereby said screw is inserted through said opening at an acute angle relative to the panel edge portion arranged between the flange and frame shoulder portion to initially penetrate the frame base portion, and thereafter the screw may be tilted toward the frame shoulder portion to forceably move the glazing block toward the frame shoulder portion, so that upon completion of penetration of said screw into said frame base portion, said panel edge portion is tightly clamped between the glazing block flange and the frame shoulder portion.

* * * * *